No. 892,324. PATENTED JUNE 30, 1908.
C. L. STAUDINGER.
DETACHABLE HANDLE FOR COOKING UTENSILS.
APPLICATION FILED JAN. 10, 1908.
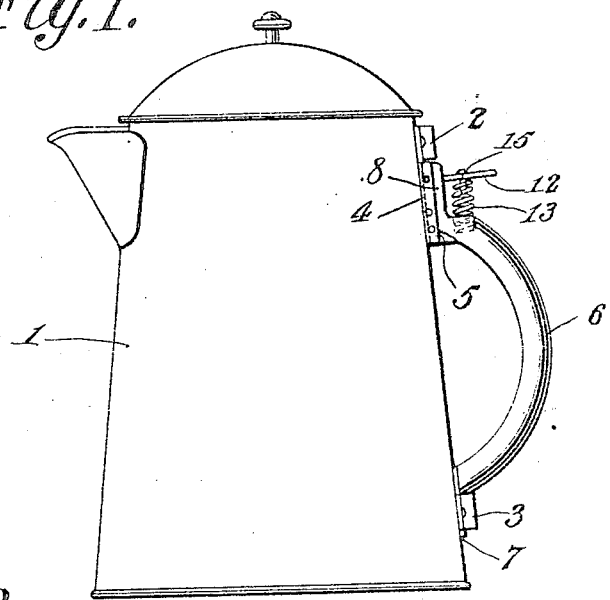
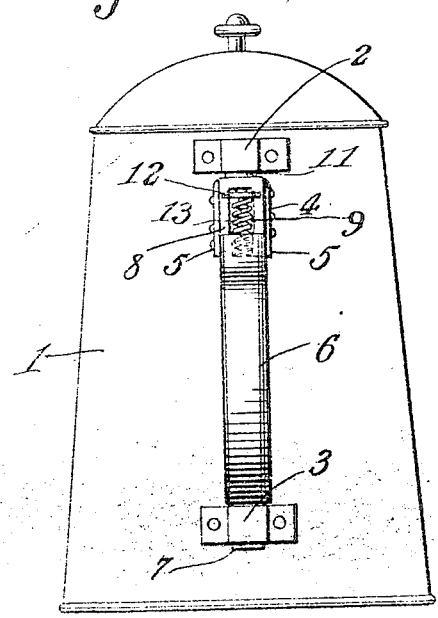
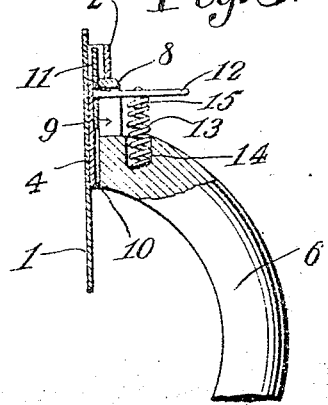
Inventor
Charles L. Staudinger,
By Victor J. Evans, Attorney
Witnesses

UNITED STATES PATENT OFFICE.

CHARLES L. STAUDINGER, OF MOLALLA, OREGON.

DETACHABLE HANDLE FOR COOKING UTENSILS.

No. 892,324.　　　　Specification of Letters Patent.　　　Patented June 30, 1908.

Application filed January 10, 1908. Serial No. 410,165.

*To all whom it may concern:*

Be it known that I, CHARLES L. STAUDINGER, a citizen of the United States, residing at Molalla, in the county of Clackamas and State of Oregon, have invented new and useful Improvements in Detachable Handles for Cooking Utensils, of which the following is a specification.

This invention is an improved detachable handle for cooking utensils, and means for securing the same, the object of the invention being to provide a handle which may be readily detached from the utensil while the latter is on the stove to prevent the handle from becoming heated, and which may be readily re-attached to the utensil when it is desired to lift and handle the same, and the said invention consists in the construction, combination and arrangement of devices hereinafter described and claimed.

In the accompanying drawings:—Figure 1 is a side elevation of a cooking utensil provided with a detachable handle constructed in accordance with this invention. Fig. 2 is a similar view at right angles to Fig. 1. Fig. 3 is a detail sectional view.

The utensil 1 to which in accordance with my invention a handle is attached is here shown as a coffee pot, but may be of any kind and of any size or construction and is provided on one side near its upper and lower ends with keepers 2, 3. The handle 6 is here shown as curved, but may be of any suitable form, is provided at its lower end with a downwardly extending tongue 7 to enter the lower keeper 3 and is provided at its upper end with an upwardly extending lug or arm 8. The face of the upper end of the handle which when the handle is in use is opposed to the utensil, is provided with a vertical recess 10 and the upstanding lug 8 is provided with a vertical slot 9 which communicates with the said recess. A plate 4 is secured on the said face of the upper portion of the handle and is here shown as having its sides outturned to form flanges 5 which are secured to the handle by means of screws or the like devices. A vertically movable tongue 11 operates in the recess 10 and is provided with an outstanding arm 12 which operates in the slot 9 and extends rearwardly from the lug 8.

In the upper portion of the handle is a socket 14 in which is fitted the lower end of a coil spring 13, the upper end of which spring bears under the arm 12 and engages a stud 15 which depends from the said arm. The function of the said spring is to move the tongue 11 upwardly to keep the said tongue normally in engagement with the upper keeper 2 and hence secure the upper end of the handle to the utensil. In order to detach the handle, it is only necessary to depress the arm 12 so as to release the tongue 11 from the keeper 2 and to then, after withdrawing the upper portion of the handle from the utensil, to raise the handle so as to disengage its lower tongue 7 from the lower keeper 3.

It will be understood from the foregoing that the handle may be readily attached to the utensil and detached therefrom at will, and that while the handle may be readily detached from the utensil by design, it can not become casually detached therefrom.

I do not desire to limit myself to the precise construction and arrangement of devices herein shown and described, as it is evident that modifications may be made within the scope of the appended claims.

Having thus described the invention, what is claimed is:

In combination with a vessel having an upper keeper and a lower keeper on one side, a handle having a fixed tongue at its lower end to engage the lower keeper and provided at its upper end in the face opposed to the vessel with a guide recess and a lug, the said lug having a slot communicating with said guide recess, a plate attached to said face of the handle and covering said guide recess, a slidable tongue in said guide recess retained therein by the said plate and having an operating device extending through the slot and a spring bearing between the handle and the operating device and serving to engage the slidable tongue solely with the upper keeper to retain the handle in operative position.

In testimony whereof I affix my signature in presence of two witnesses.

CHARLES L. STAUDINGER.

Witnesses:
　R. D. BALL,
　D. C. BALL